US009106106B2

(12) United States Patent
Liu et al.

(10) Patent No.: US 9,106,106 B2
(45) Date of Patent: Aug. 11, 2015

(54) METHOD AND APPARATUS FOR LOCATING A PORTABLE DEVICE AND THEN TRANSMITTING POWER OVER WIRELESS SIGNAL

(75) Inventors: Eric Liu, Santa Clara, CA (US); Manjirnath Chatterjee, San Francisco, CA (US); Nathaniel Wolf, San Francisco, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 756 days.

(21) Appl. No.: 13/051,643

(22) Filed: Mar. 18, 2011

(65) Prior Publication Data

US 2012/0235499 A1 Sep. 20, 2012

(51) Int. Cl.
*H02J 17/00* (2006.01)

(52) U.S. Cl.
CPC ...................................... *H02J 17/00* (2013.01)

(58) Field of Classification Search
None
See application file for complete search history.

(56) References Cited

U.S. PATENT DOCUMENTS

| 4,187,506 | A * | 2/1980 | Frosch et al. ................. 342/352 |
| 5,457,469 | A * | 10/1995 | Diamond et al. .............. 343/730 |
| 6,437,685 | B2 * | 8/2002 | Hanaki ..................... 340/286.02 |
| 6,967,462 | B1 * | 11/2005 | Landis .......................... 320/101 |
| 2007/0007821 | A1 * | 1/2007 | Rossetti ........................ 307/22 |
| 2008/0014897 | A1 * | 1/2008 | Cook et al. ................. 455/343.1 |
| 2008/0125630 | A1 * | 5/2008 | Caylor ........................... 600/300 |
| 2008/0187067 | A1 * | 8/2008 | Wang et al. ................... 375/267 |
| 2009/0149136 | A1 * | 6/2009 | Rofougaran .................... 455/77 |
| 2010/0079011 | A1 * | 4/2010 | Hyde et al. .................... 307/149 |
| 2010/0181961 | A1 * | 7/2010 | Novak et al. .................. 320/108 |
| 2012/0096492 | A1 * | 4/2012 | Urban et al. .................... 725/39 |

FOREIGN PATENT DOCUMENTS

JP 2004214864 A * 7/2004

OTHER PUBLICATIONS

H. Liu, H. Darabi, P. Banerjee, J. Liu. "Survey of Wireless Indoor Positioning Techniques and Systems". Nov. 2007. Published in "Systems, Man, and Cybernetics, Part C: Applications and Reviews, IEEE Transactions on", vol. 37 Issue 6, pp. 1067-1080.*
A. Eltaher, I. Ghalayini, T. Kaiser. "Towards UWB Self-Positioning Systems for Indoor Environments Based on Electric Field Polarization, Signal Strength and Multiple Antennas". Sep. 2005. Published in "Wireless Communication Systems, 2005. 2nd International Symposium on", pp. 389-393.*
Wireless Charging of Mobile Phones Using Microwaves; <http://www.fullinterview.com/paper-presentations2/wireless-charging-of-moblie-phones-using-microwaves-37064.html >Aug. 26, 2010.
Wireless Charging of Mobile Phones Using Microwaves; <http://www.fullinterview.com/paper-presentations2/wireless-charging-of-mobile-phones-using-microwaves-37064.html >Sep. 15, 2010.

* cited by examiner

*Primary Examiner* — Rexford Barnie
*Assistant Examiner* — David Shiao
(74) *Attorney, Agent, or Firm* — Kilpatrick Townsend & Stockton LLP

(57) ABSTRACT

A device with a sensor to detect a location of a portable device within proximity of the device and a controller to identify an amount of power to transmit to the portable device and reposition a directional antenna to transmit to the portable device an identified amount of power over a wireless signal based on the location of the portable device.

19 Claims, 7 Drawing Sheets

METHOD AND APPARATUS FOR LOCATING A PORTABLE DEVICE AND THEN TRANSMITTING POWER OVER WIRELESS SIGNAL

BACKGROUND

When charging one or more portable devices, a user can initially locate an available power outlet, such as an AC (alternating current) outlet and/or a DC (direct current) outlet. The user can then proceed to plug a charging connector of the portable device directly into the power outlet. Alternatively, the user can access a charging cable for the portable device and proceed to couple the charging connector of the portable device with the available power outlet. Once coupled, the power outlet can supply power to the portable device or the portable device can draw power from the power outlet.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the disclosed embodiments.

DETAILED DESCRIPTION

By utilizing a sensor to detect a portable device within proximity of a device, the device can accurately detect one or more portable devices within range of the device to supply power to. Additionally, by detecting information from the portable device, the device can identify a proper amount of power to supply the portable device. In one embodiment, identifying the amount of power includes identifying a voltage, a current, and/or rate of transfer compatible with the portable device. By identifying the proper amount of power to transmit, the portable device and components of the portable device will not be damaged when receiving power from the device.

Additionally, using the previously detected location of the portable device, a directional antenna can be repositioned to transmit the identified amount of power to the portable device over a wireless signal. By repositioning the directional antenna based on the detected location of the portable device, a connection, link, and/or path between the directional antenna and the portable device can be improved and/or calibrated for the directional antenna to transmit power to the portable device. As a result, the portable device can stably be charged while reducing the chance of power being wasted or lost from a poor connection or link between the directional antenna and the portable device.

Figure 1:
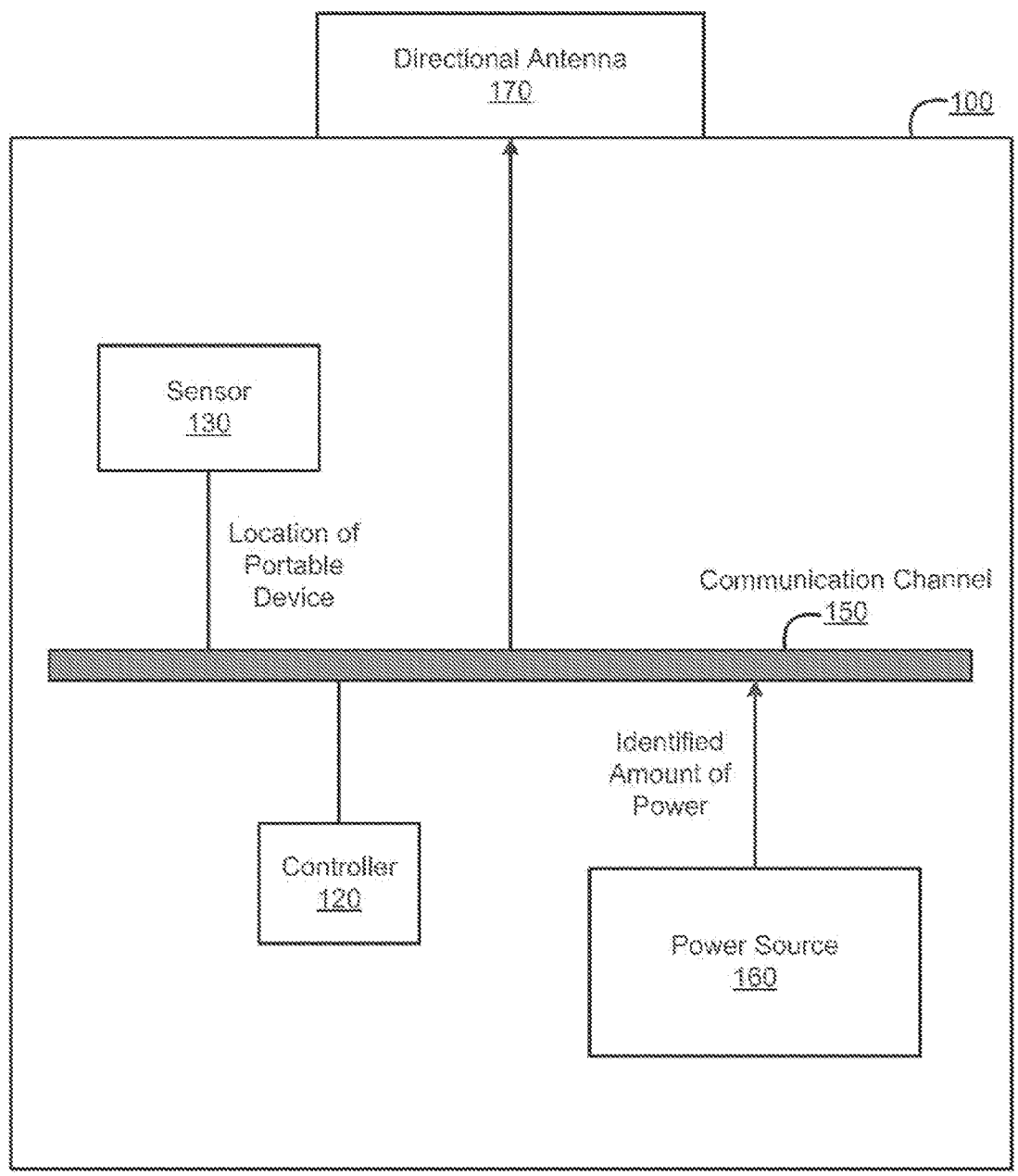
FIG. 1 illustrates a device with a controller, a sensor, a power source, and a directional antenna according to an embodiment.

FIG. 1 illustrates a device 100 with a controller 120, a sensor 130, a power source 160, and a directional antenna 170 according to an embodiment. In one embodiment, the device 100 is a power station, a charging station, and/or a docking station. In another embodiment, the device 100 is a desktop, a laptop, a notebook, a tablet, a netbook, an all-in-one system, and/or a server. In other embodiments, the device 100 is a cellular device, a PDA (Personal Digital Assistant), an E (Electronic) Book/Reader and/or any additional device which can include a sensor 130, a power source 160, and/or a directional antenna.

As illustrated in FIG. 1, the device 100 includes a controller 120, a sensor 130, a power source 160, a directional antenna 170, and a communication channel 150 for the device 100 and/or one or more components of the device 100 to communicate with one another. In one embodiment, the device 100 additionally includes a power application stored on a computer readable medium coupled to the device 100. In other embodiments, the device 100 includes additional components and/or is coupled to additional components in addition to and/or in lieu of those noted above and illustrated in FIG. 1.

As noted above, the device 100 includes a controller 120. The controller 120 can send data and/or instructions to the components of the device 100, such as the sensor 130, the power source 160, the directional antenna 170, and/or the power application. The controller 120 can also receive data and/or instructions from components of the device 100, such as the sensor 130, the power source 160, the directional antenna 170, and/or the power application.

The power application is an application which can be utilized in conjunction with the controller 120 to transmit power over a wireless signal from the device 100 to a portable device detected to be within proximity of the device 100. The power application communicates with devices and/or components coupled to the device 100 physically or wirelessly through a communication bus 150 included in or attached to the device 100. The communication bus 150 can be a memory bus and/or a data bus.

The portable device can be a cellular device, a PDA, an E Book/Reader, a media player, a camera, and/or the like. In another embodiment, the portable device can be a laptop, a notebook, a tablet, a netbook, and/or a peripheral for a computing machine. A sensor 130 of the device 100 can initially detect a location of the portable device within proximity of the device 100. The sensor 130 is a hardware component of the device 100 configured to detect a portable device within proximity of the device 100 and detect a location of the portable device.

In one embodiment, the sensor 130 can emit one or more polarized waves around the proximity of the device 100 to detect the location of the portable device. If a portable device is detected within proximity of the device 100 by the sensor 130, the controller 120 and/or the power application can proceed to detect information from the portable device to identify an amount of power to transmit to the portable device. In one embodiment, when identifying the amount of power to transmits, the controller 120 and/or the power application can identify a compatible voltage, current, and/or rate of transfer to use to transmit power to the portable device.

The information from the portable device can include a power requirement of the portable device. In another embodiment, the information can include an identification of the portable device. In other embodiments, the information can include a make, a model, and/or a manufacturer of the portable device. The information from the portable device can be detected by the sensor 130. In another embodiment, the device 100 can include a communication component which can be utilized by the controller 120 and/or the power application to detect the information from the portable device.

In response to identifying an amount of power to supply the portable device, the controller 120 and/or the power application can reposition the directional antenna 170 based on the detected location of the portable device and proceed to transmit the identified amount of power over a wireless signal.

The identified amount of power can be supplied and/or drawn from a power source 160 of the device 100. The power source 160 is a hardware component of the device 100 configured to supply the identified amount of power for the directional antenna 170 to transmit.

The directional antenna 170 can transmit the identified power over a wireless signal. The directional antenna 170 is a hardware component of the device 100 which can reposition to one or more directions and transmit the identified amount of power over the wireless signal. In one embodiment, the directional antenna is a beam antenna. For the purposes of this application, the wireless signal can be or include a RF (radio frequency) signal, an electromagnetic wave, an acoustic wave, and/or any signal which can be wirelessly broadcasted over one or more frequencies and/or bands.

Figure 2:
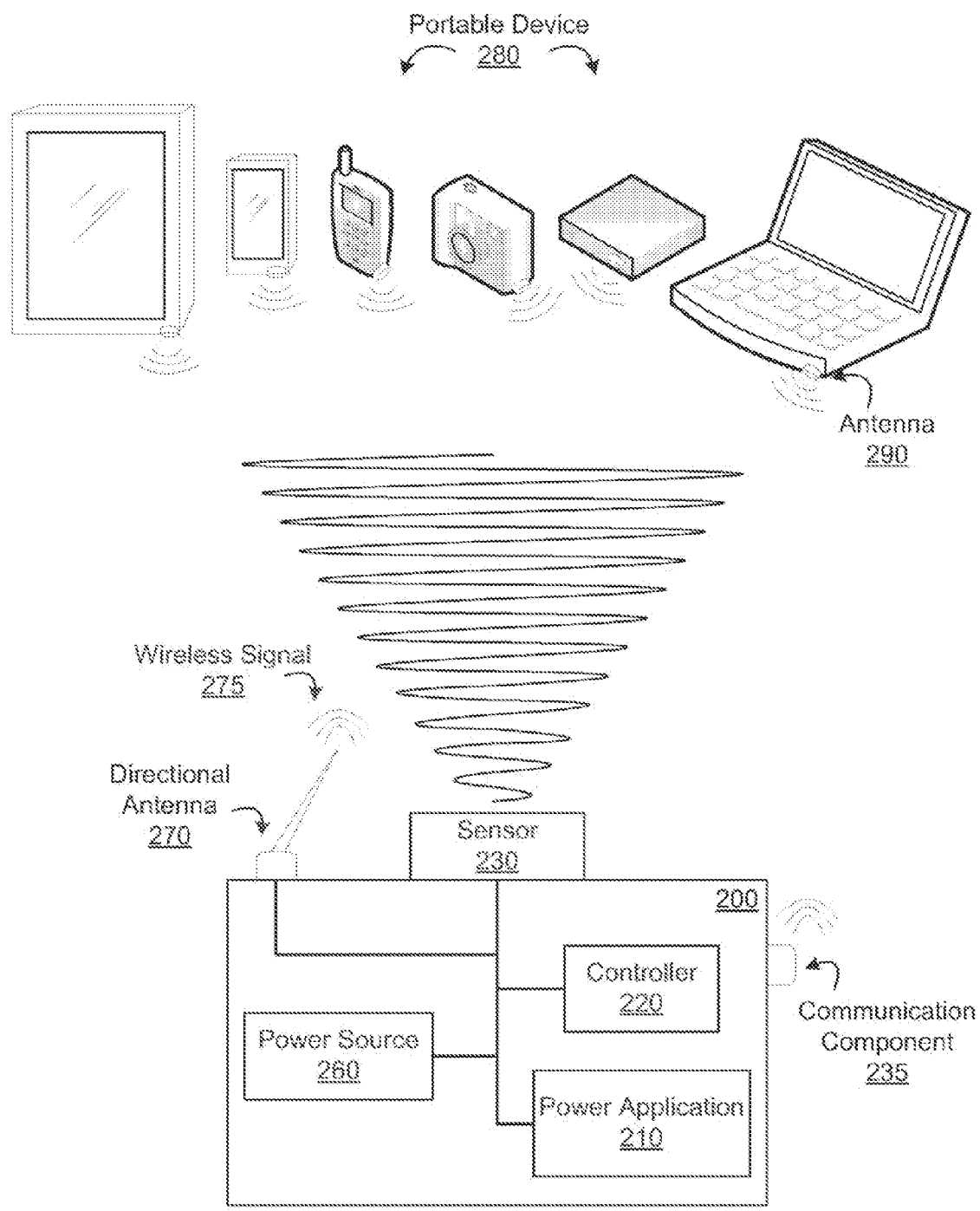
FIG. 2 illustrates a sensor of a device detecting a location of a portable device according to an embodiment.

FIG. 2 illustrates one or more sensors 230 of a device 200 detecting a location of a portable device 280 according to an embodiment. As shown in FIG. 2, a portable device 280 can be a cellular device, a PDA, an E Book/Reader, a media player, a camera, and/or the like. In another embodiment, the portable device 280 can be a laptop, a notebook, a tablet, a netbook, and/or a peripheral for a computing machine. In other embodiments, the portable device 280 can be a wireless headset, a wireless microphone or speaker, a portable battery, a picture frame, a remote control, a home automation device, and/or any additional device which can receive power over a wireless signal 275.

As shown the present embodiment, the portable device 280 can include an antenna 290. The antenna 290 is a hardware component of the portable device 280 configured to receive power from the device 200 over the wireless signal 275. In one embodiment, the antenna 290 is an omni-directional antenna. In another embodiment, the antenna 290 is a directional antenna. In other embodiments, the antenna 290 can be a diversity antenna. The antenna 290 can transfer any received power from the wireless signal 275 to a portable power source of the portable device 280. The portable power source can be a power supply of the portable device 280 which can use the received power to power the portable device 280 and/or charge a battery of the portable device 280.

Before the device 200 transmits power to the portable device 280, one or more sensors 230 of the device 200 can initially detect a location of the portable device 280 within proximity of the device 200. For the purposes of this application, the portable device 280 can be within proximity of the device 200 if one or more sensors 230 detect the portable device 280 to be within range of one or more wireless signals 275 transmitted by a directional antenna 270. As noted above, a sensor 230 is a hardware component of the device 200 configured to detect the location of the portable device 280 within proximity of the device 200.

One or more of the sensors 230 can be included in the device 200 and/or can be coupled to one or more locations on a surface of the device 200. In one embodiment, one or more of the sensors 230 can include an acoustic component, an image capture component, a seismic detection component, a proximity sensor, an antenna, and/or any additional hardware component which can detect a location of the portable device 280 within proximity of the device 200.

When detecting the location of the portable device 280, a sensor 230 can detect and/or capture information around the device 200 continuously, periodically, and/or upon request by a controller 220 and/or a power application 210 of the device 200. In one embodiment, detecting the location of the portable device 280 includes detecting a distance of the portable device 280 from the device 200 and/or the directional antenna 270.

The sensor 230 can emit one or more signals to detect the location of the portable device 280. Additionally, one or more of the signals can be emitted as ultra wide bands. In one embodiment, one or more of the signals can include elliptical polarized waves, linear polarized waves, and/or circularly polarized waves which can be emitted in one or more directions around the device 200. When emitting one or more of the signals, the sensor 230 can reposition to one or more directions to emit the polarized waves. Repositioning can include the sensor 230 moving horizontally, moving vertically, and/or rotating around one or more axis.

If the portable device 280 is in a path or within range of one or more of the emitted signals, the signal can provide a response back to the sensor 230. In another embodiment, the portable device 280 and/or the antenna 290 of the portable device 280 can send a response back to the sensor 230. The sensor 230 can detect the response from the signal and/or the portable device 280 and calculate a time of flight of the response to detect the location of the portable device 280 relative to the device 200. Using the time of flight response, the sensor 230 can mark coordinates on a three dimensional map of where the signal was being emitted to identify the location and/or distance of the portable device 280.

In response to the sensor 230 detecting the location of the portable device 280, the controller 220 and/or the power application 210 can proceed to detect information from the portable device 280 to identify an amount of power to supply the portable device 280. As shown in FIG. 2, the device 200 can include a communication component 235. The communication component 235 is a hardware component of the device 200 configured to wirelessly send and/or receive information from the portable device 280. In one embodiment, the communication component 235 can be or include a radio component, a BLUETOOTH™ component, an infrared component, a wireless network component, and/or any additional component configured to wirelessly receive and/or send information.

The communication component 235 can receive, pull, and/or poll the information from the portable device 280. In one embodiment, the portable device 280 can include a portable communication component to communicate the information of the portable device with the communication component 235. In another embodiment, the antenna 290 of the portable device 280 can be used to wirelessly communicate the information of the portable device to the communication component 235.

Using the detected information, the controller 220 and/or the power application 210 can identify an amount of power to send to the portable device 280. The power can be supplied from a power source 260 coupled to the device 200. As noted above, the power source 260 is a hardware component configured to supply the identified amount of power to a directional antenna 270 of the device 200. The power source 260 can be a power supply, a battery, and/or a generator of the device 200. In one embodiment, the power source 260 can manage and/or control the amount of power supplied to the directional antenna 270. In another embodiment, the directional antenna 270 can draw the identified amount of power from the power source 260.

The directional antenna 270 can transmit the identified amount of power from the power source 260 to an antenna 290 of the portable device 280 over a wireless signal 275. As shown in the present embodiment, the directional antenna 270 is a hardware component which can reposition to one or more directions, positions, and/or locations and transmit the identified amount of power over a wireless signal 275. In one embodiment, the directional antenna is a beam antenna. When transmitting the identified power over the wireless signal 275, the wireless signal 275 can be transmitted as a RF (radio frequency) signal, an electromagnetic wave, an acoustic wave, and/or any signal which can be wirelessly broadcasted over one or more frequencies and/or bands by the directional antenna 270.

Additionally, the directional antenna 270 can reposition or be instructed to reposition by the controller 220 and/or the power application 210 based on the detected location of the portable device 280. In another embodiment, the directional antenna 270 can reposition based on information received from the portable device 280. The information can list and/or specify a location and/or orientation of the portable device 280 detected by one or more sensors of the portable device 280. One or more of the sensors of the portable device 280 can include an accelerometer, a gyroscope, a radio frequency device, and/or a global positioning system of the portable device 280.

By repositioning, the directional antenna 270 can improve a connection, power link, and/or a line of sight between the directional antenna 270 and the antenna 290 of the portable device 280. The directional antenna 270 can reposition by moving along one or more axes, for example an x-axis, a y-axis, and/or a z-axis. In another embodiment, repositioning includes the directional antenna 270 rotating around one or more axes.

Figure 3A:
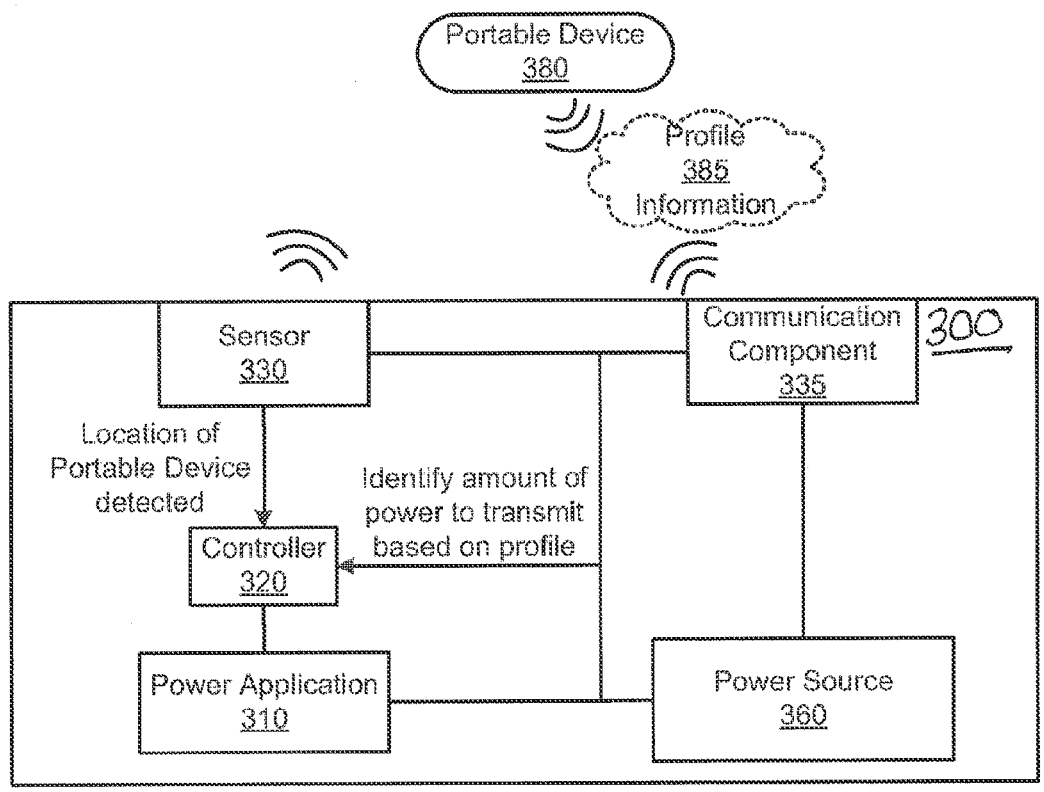
FIG. 3A and FIG. 3B illustrate block diagrams of a power application identifying an amount of power to transmit to a portable device in response to a sensor detecting the portable device according to embodiments.
Figure 3B:
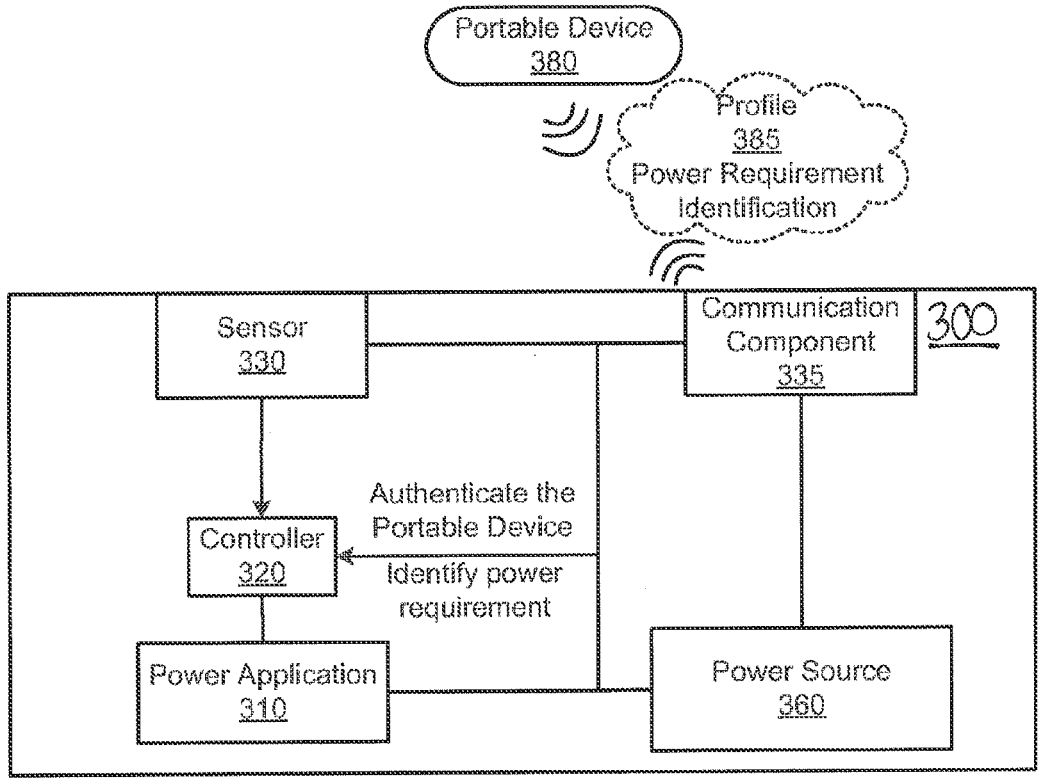

FIG. 3A and FIG. 3B illustrate block diagrams of a power application 310 identifying an amount of power to transmit to a portable device 380 in response to a sensor 330 detecting the portable device 380 according to embodiments. As shown in FIG. 3A, in response to the sensor 330 detecting the location of the portable device 380, the controller 320 and/or the power application 310 can proceed to detect information from the portable device 380.

In one embodiment, the information from the portable device 380 can include a profile 385 of the portable device. The profile 385 of the portable device can be a signal and/or a file which can include information of the portable device 380. The profile 385 can be stored on the portable device 380 and can be pulled from the portable device 380 by a communication component 335 of the device 300. In another embodiment, the profile 385 can be pushed and/or sent by the portable device 380 to the communication component 335.

The profile 385 can include a make, a model, and/or a manufacturer of the portable device 380. In other embodiments, the profile 385 can include additional information. and/or details of the portable device 380 in addition to and/or in lieu of those noted above. Using the information from the profile 385, such as the make, model, and/or manufacturer of the portable device 380, the controller 320 and/or the power application 310 can accurately identify a proper amount of power to supply the portable device 380. The power can be supplied from a power source 360 coupled to device 300.

In one embodiment, the controller 320 and/or the power application 310 can access a local or remote database, list, and/or file to identify the amount of power to supply the portable device 380. The controller 320 and/or power application 310 can search the database, list, and/or file to determine whether they list an amount of power corresponding to the make, the model, and/or the manufacturer included in the profile 385. If the database, list, and/or file specify an amount of power corresponding to the make, the model, and/or the manufacturer, the controller 320 and/or the power application 310 will have identified the amount of power to supply the portable device 380.

In another embodiment, as illustrated in FIG. 3B, the profile 385 from the portable device 380 can list an identification of the portable device 380 and a power requirement for the portable device 380. Using the listed power requirement, the controller 320 and/or the power application 310 can identify an amount of power to supply the portable device 380 without searching one or more database, lists, and/or files. In one embodiment, the power requirement can specify a compatible voltage, current, frequency, and/or rate of transfer for the device 300 to utilize when supplying power to the portable device 380.

Additionally, as shown in FIG. 3B, the controller 320 and/or the power application 310 can authenticate the portable device 380 before transmitting power to the portable device 380. In one embodiment, the controller 320 and/or the power application 310 can authenticate the portable device 380 with an identification received from the portable device 380. The identification can list a pin, serial, username, and/or any additional identification of the portable device 380.

The controller 320 can/or the power application 310 can determine whether the identification is valid or included in an approved list when authenticating the portable device 380. Once the portable device 380 has been authenticated, the controller 320 and/or the power application 310 can proceed to use a directional antenna to transmit the identified amount of power to the portable device 380.

Figure 4A:
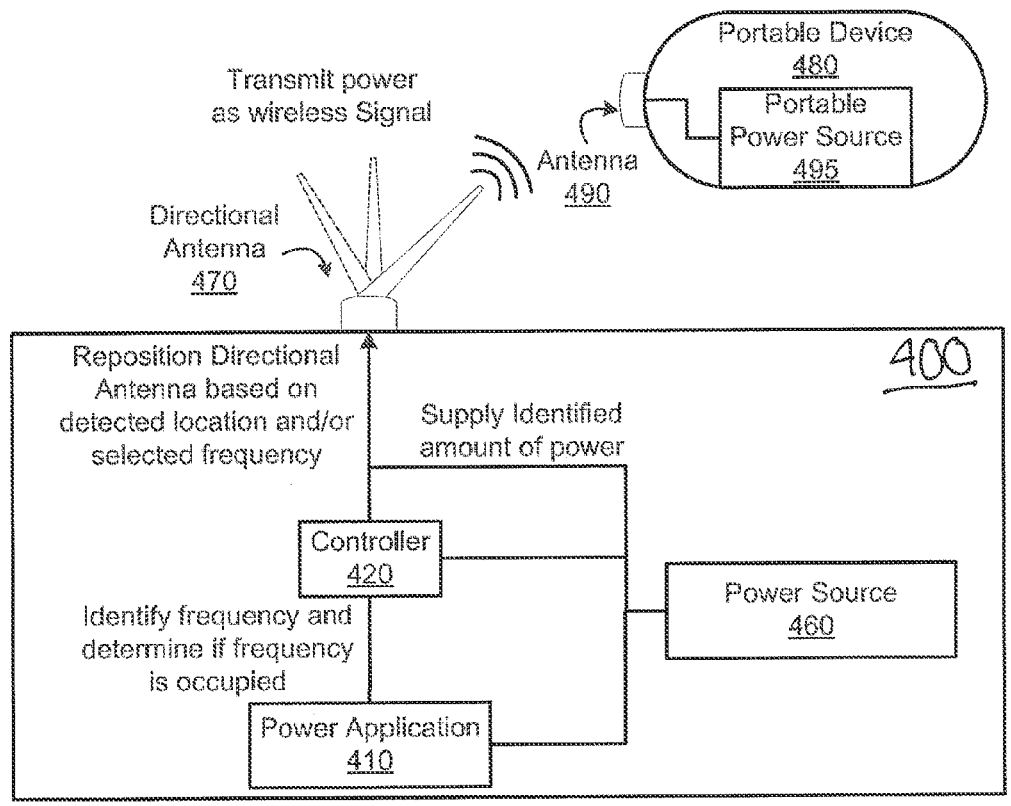
FIG. 4A and FIG. 4B illustrate block diagrams of a power application repositioning a directional antenna to transmit power to a portable device over a wireless signal according to an embodiment.
Figure 4B:
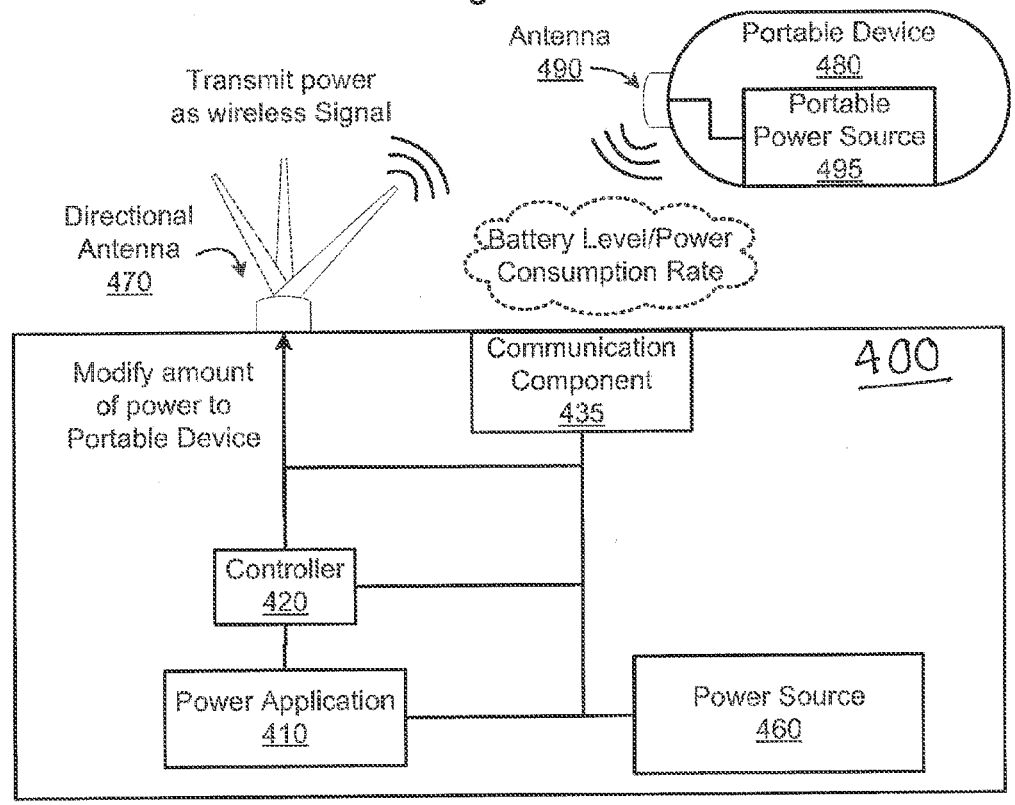

FIG. 4A and FIG. 4B illustrate block diagrams of a power application 410 repositioning a directional antenna 470 to transmit power to a portable device 480 over a wireless signal according to an embodiment. As noted above, the power can be transmitted from the power source 460 of the device 400. In one embodiment, transmitting power to the portable device 480 includes selecting and/or identifying a frequency for the directional antenna 470 to utilize to transmit the wireless signal.

The controller 420 and/or the power application 410 can select and/or identify a frequency to utilize to when transmitting the wireless signal. In one embodiment, the controller 420 and/or the power application 410 can randomly select a frequency. In another embodiment, the controller 420 and/or the power application 410 can determine whether the information detected from the portable device 480 specified a frequency to utilize. In other embodiments, the controller 420 and/or the power application 410 can select a previously used frequency if the device 400 previously supplied power to the portable device 480.

Based on the previously detected location and/or the selected frequency, the directional antenna 470 can be repositioned to transmit the wireless signal with the identified amount of power to the portable device 480. In one embodiment, the directional antenna 470 can also be repositioned based on information detected from the portable device 480. As noted above, the information from the portable device 480 can specify an orientation and/or a location detected by a sensor of the portable device 480.

The directional antenna 470 can independently and/or upon instruction from the controller 420 and/or the power application 410 reposition. As noted above, the directional antenna 470 can reposition along and/or around one or more axes, such as an x, y, and/or z axis. By repositioning, the directional antenna 470 can improve a connection, power link, and/or a line of sight between the directional antenna 470 and the antenna 490 of the portable device 480.

Once the directional antenna 470 has been repositioned, the directional antenna 470 can transmit the identified amount of power over the wireless signal to the antenna 490 of the portable device 480. In one embodiment, the directional antenna 470 transmits the wireless signal to the antenna 490 of the portable device 480 as a directional beam. The wireless signal can include a compatible voltage, current, frequency, and/or rate of transfer for the portable device 480. In response to receiving the wireless signal with the identified amount of power, a portable power source 495 can use the power to power the portable device 480 or store the power.

In one embodiment, while transmitting the identified power, the directional antenna 470 and/or a sensor of the device can additionally determine whether another object is obstructing the wireless signal and/or if the frequency utilized to transmit the wireless signal is already utilized by the device, the portable device, and/or another device. If another object is obstructing the wireless signal, the directional antenna 470 can reposition to another location or position and proceed to transmit the identified amount of power over the wireless signal through or around the object.

Additionally, if the selected frequency is already being utilized, the controller 420 and/or the power application 410 can select another frequency to utilize for the wireless signal. In another embodiment, instead of selecting another frequency, the directional antenna 470 can be dynamically tuned so as reduce noise and/or interference from continuing to use the frequency.

In another embodiment, as illustrated in FIG. 4B, while the directional antenna 470 transmits the wireless signal, a communication component 435 of the device can receive and/or detect information from the portable device 480. In one embodiment, the detected information can include an updated position and/or orientation of the portable device 480. The portable device 480 can continue to transmit to the communication component updated information of the location and/or orientation of the portable device 480 as the portable device 480 moves. Based on any updated position and/or orientation of the portable device 480, the directional antenna 470 can be repositioned.

In another embodiment, as illustrated in FIG. 4B, the information can specify a power battery level of the portable device 480 and/or a power consumption rate of the portable device 480. In response to detecting the battery level and/or power consumption rate of the portable device 480, the controller 420 and/or the power application 410 can modify an amount and/or a rate of power supplied to the portable device 480. In one embodiment, if the battery level of the portable device 480 is low and/or if the power consumption rate of the portable device 480 is detected to be high, the power source 460 can increase a rate and/or an amount of power supplied to the directional antenna 480. In another embodiment, if the battery level of the portable device 480 is high and/or if the power consumption rate of the portable device 480 is low, the power source 460 can decrease an amount of a rate of power supplied to the directional antenna 470.

Figure 5:
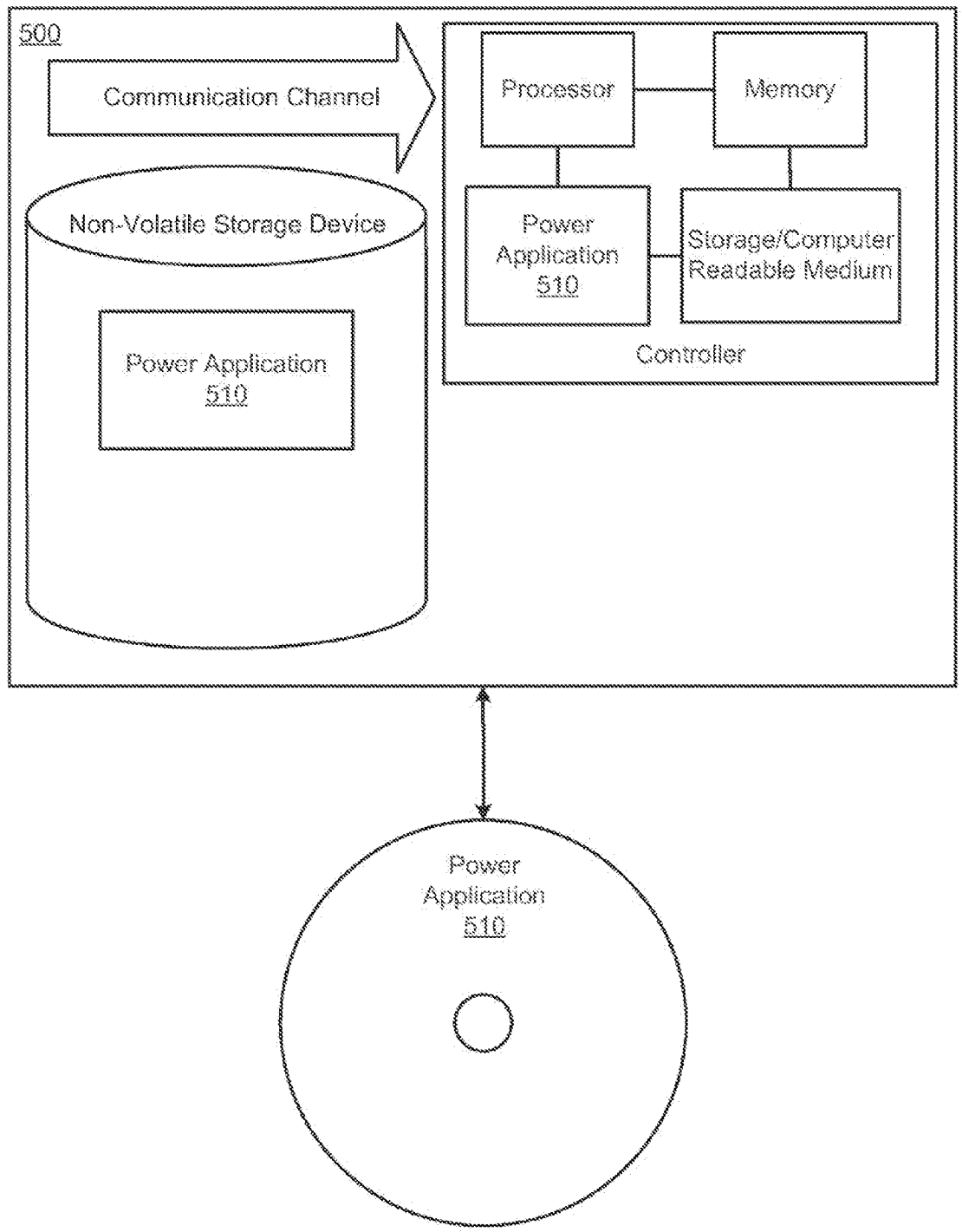
FIG. 5 illustrates a power application on a device and a power application stored on a removable medium being accessed by the device according to an embodiment.

FIG. 5 illustrates a device 500 with a power application 510 and a power application 510 stored on a removable medium being accessed by the device 500 according to an embodiment of the invention. For the purposes of this description, a removable medium is any tangible apparatus that contains, stores, communicates, or transports the application for use by or in connection with the device 500. In one embodiment, the power application 510 is firmware that is embedded into one or more components of the device 500 as ROM (read only memory). In other embodiments, the power application 510 is an application which is stored and accessed from a hard drive, a compact disc, a flash disk, a network drive or any other form of computer readable medium that is coupled or accessible to the device 500.

Figure 6:
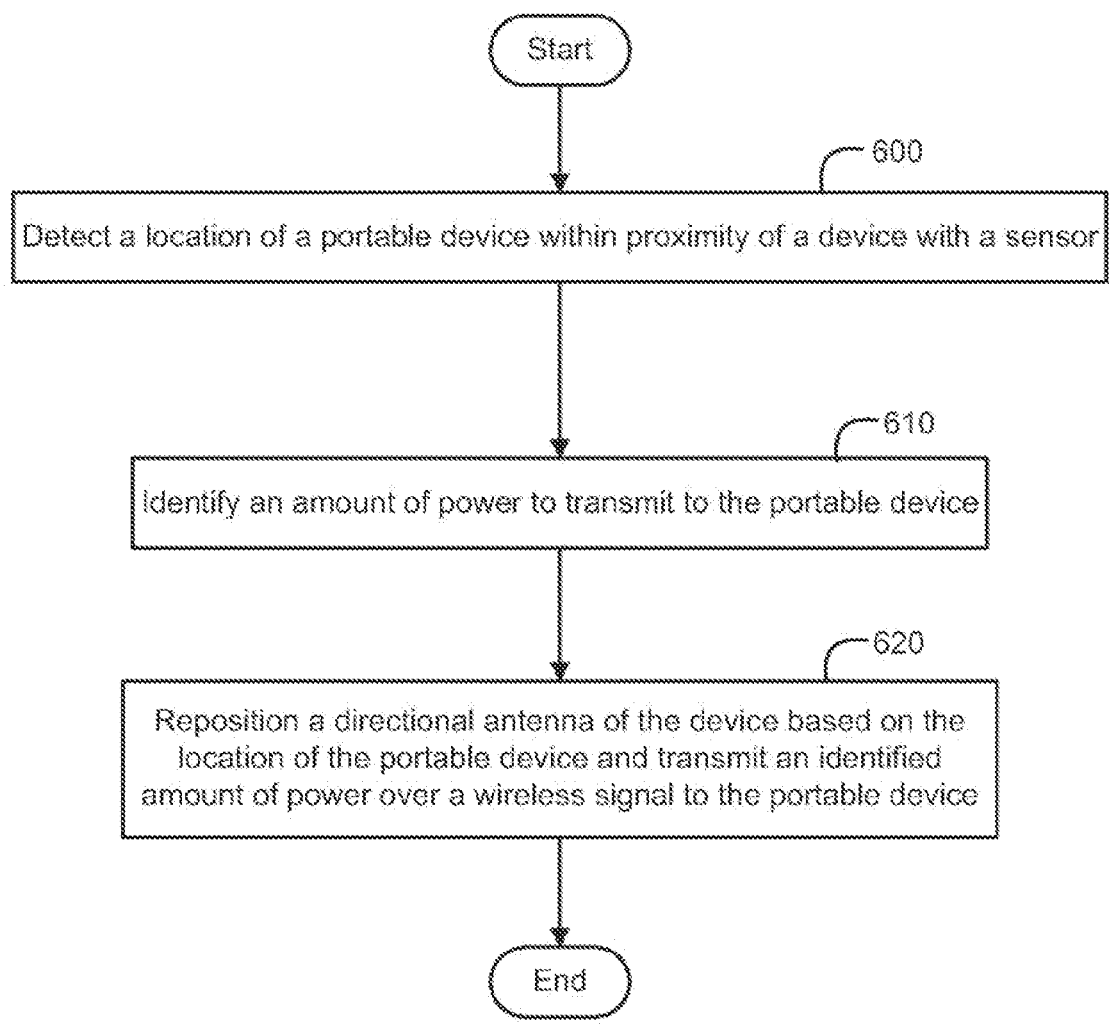
FIG. 6 is a flow chart illustrating a method for transmitting power to a portable device according to an embodiment.

FIG. 6 is a flow chart illustrating a method for responding to an emergency event according to an embodiment. The method of FIG. 6 uses a device with a controller, a sensor, a power source, a directional antenna, a communication channel, and/or a power application. In other embodiments, the method of FIG. 6 uses additional components and/or devices in addition to and/or in lieu of those noted above and illustrated in FIGS. 1, 2, 3, 4, and 5.

As noted above, the power application is an application which can be used in conjunction with the controller to manage the transmitting of power from the device to a portable device. A sensor of the device can detect a location of the portable device within proximity of the device at 600. In one embodiment, one or more of the sensors can include an acoustic component, an image capture component, a seismic detection component, a proximity sensor, an antenna, and/or any additional hardware component which can detect a location of the portable device within proximity of the device.

A portable device can be within proximity of the device if the portable device is within range to receive one or more wireless signals transmitted from a directional antenna of the device. In one embodiment, the sensor can emit one or more signals in one or more directions around the device. The sensor can then scan for a response to identify the location of the portable device relative to the device. Once the location of the portable device has been detected, the controller and/or the power application can proceed to identify an amount of power to transmit to the portable device at 610.

In one embodiment, a communication component of the device can detect information from the portable device to identify the amount of power to transmit to the portable device. As noted above, the detected information can include a power requirement of the portable device. In another embodiment, the detected information can include a make, model, and/or manufacturer of the portable device. The controller and/or the power application can use the information to identify the amount of power to supply to the portable device.

The directional antenna can then reposition, based on the previously detected location of the portable device, and proceed to transmit the identified amount of power over a wireless signal to an antenna of the portable device at 620. As noted above, the directional antenna can reposition into one or more directions, locations, and/or positions by moving along and/or rotating around one or more axes. Additionally, the wireless signal can be transmitted as a directional beam to the antenna of the portable device.

In response the antenna of the portable device receiving power from the device, a portable power source of the portable device can store the power or supply the power to components of the portable device. The method is then complete. In other embodiments, the method of FIG. 6 includes additional steps in addition to and/or in lieu of those depicted in FIG. 6.

Figure 7:
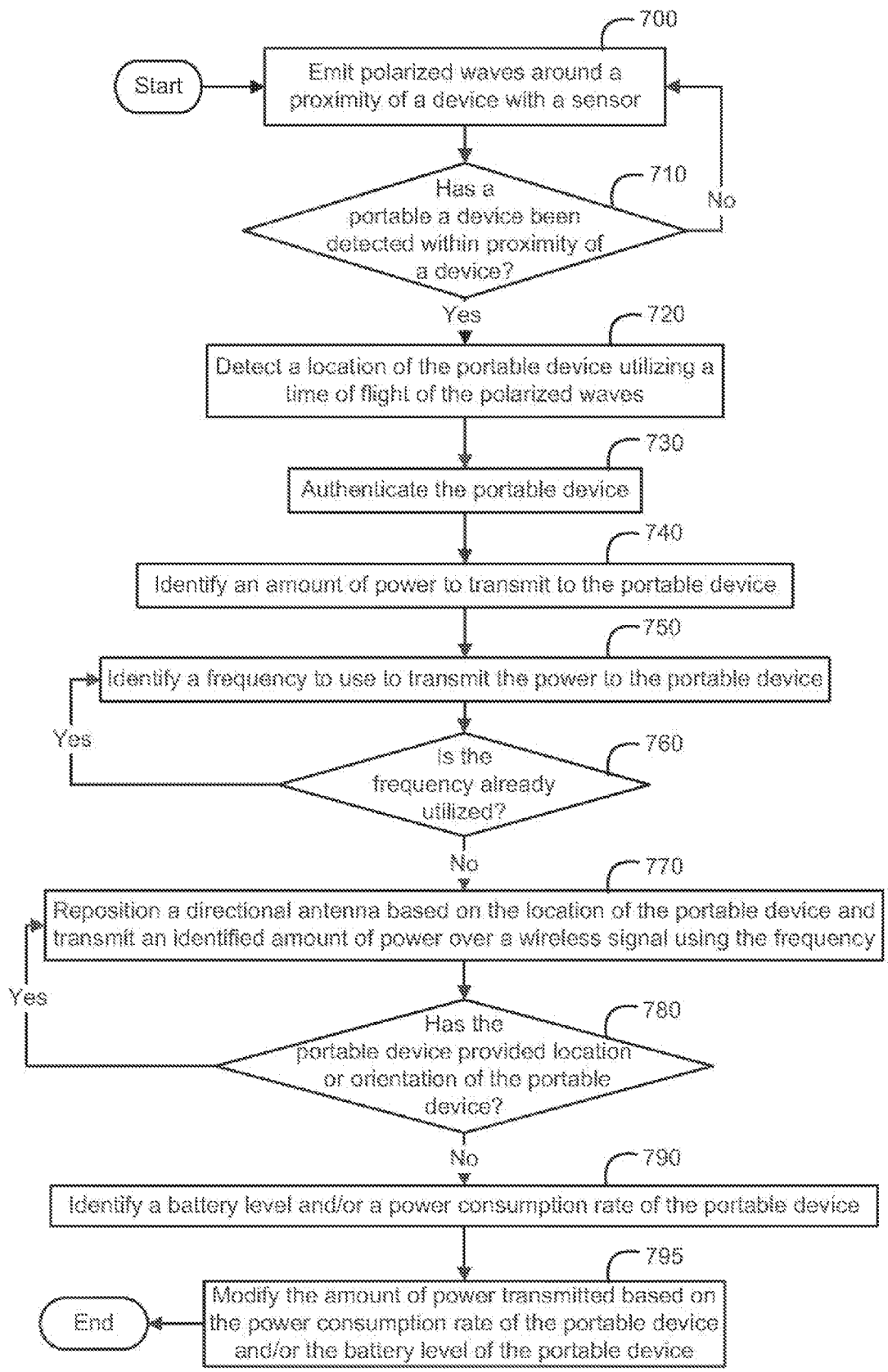
FIG. 7 is a flow chart illustrating a method for transmitting power to a portable device according to another embodiment.

FIG. 7 is a flow chart illustrating a method for responding to an emergency event according to another embodiment. Similar to above, the method of FIG. 7 uses a device with a controller, a sensor, a power source, a directional antenna, a communication channel, and/or a power application. In other embodiments, the method of FIG. 7 uses additional components and/or devices in addition to and/or in lieu of those noted above and illustrated in FIGS. 1, 2, 3, 4, and 5.

The sensor can initially emit one or more signals, such as polarized waves around a proximity of the device at 700. As noted above, the polarized waves can be elliptical polarized waves, linear polarized waves, and/or circularly polarized waves. The sensor can determine whether a portable device has been detected within proximity of the device at 710. In one embodiment, the sensor can determine that the portable device is detected with proximity of the device if the sensor detects responses from the emitted signals and/or from the portable device.

Additionally, the sensor can use a time of flight of the signal, such as the polarized wave, or a time of flight of the response to detect the location of the portable device 720. In response to detecting the location of the portable device, the controller and/or the power application can use a communication component of the device to detect information from the portable device. In one embodiment, the information can include an identification of the portable device.

The controller and/or the power application can use the identification of the portable device to authenticate the portable device 730. If the device fails authentication, the method is complete. In another embodiment, in response to authenticating the portable device, the controller and/or the power application can identify an amount of power to transmit to the portable device 740. When identifying the amount of power to transmit, the controller and/or the power application can determine whether the detected information lists a power requirement of the portable device.

If the power requirement is listed, the controller and/or the power application can identify the listed power requirement as the identified amount of power to transmit. In another embodiment, the controller and/or the power application can use information, such as a make, a model, and/or a manufacturer of the portable device to identify the amount of power to transmit to the portable device. Once the amount of power has been identified, the controller and/or the power application can select and/or identify a frequency to utilize to transmit the power over the wireless signal 750.

The controller and/or the power application can then determine whether the frequency is already being utilized by the device, the portable device, and/or another device 760. If the frequency is already being utilized, the controller and/or the power application can select another frequency and proceed to determine if the selected frequency is already utilized 760. If it is not being used, the directional antenna can then be repositioned based on the previously detected location of the portable device and/or the selected frequency. The directional antenna can then transmit the identified amount of power over the wireless signal using the selected frequency 770.

In another embodiment, instead of selecting another frequency, the directional antenna can be dynamically tuned as to reduce any noise or interference which may be caused from continuing to use the frequency. Additionally, as noted above, the portable device can move or reposition. The controller and/or the power application can determine if the portable device has moved 780. If the portable device repositions or moves, the portable device can send information of an updated location and/or orientation of the portable device to the communication component.

In another embodiment, the sensor and/or the directional antenna can detect the portable device moving. In response to the portable device moving, the controller and/or the power application will then determine that the portable device has moved and proceed to reposition the directional antenna based on the updated location and/or orientation of the portable device 770. In another embodiment, if the portable device did not detect updated information from the portable device or if the sensor and/or the directional antenna did not detect the portable device to be moving, the directional antenna can continue transmitting the identified amount of power over the wireless signal.

The controller and/or the power application can then identify a battery level and/or a power consumption rate of the portable device 790. Based on the power consumption rate and/or the battery level of the portable device, the controller and/or the power source can modify an amount of power supplied from the power source to be transmitted by the directional antenna 795. The method is then complete. In other embodiments, the method of FIG. 7 includes additional steps in addition to and/or in lieu of those depicted in FIG. 7.

What is claimed is:

1. A method for transmitting power to a portable device comprising:
    detecting a location of the portable device within proximity of a device with a sensor, wherein the location comprises a direction and a distance of the portable device relative to the device;
    identifying an amount of power to transmit to the portable device;
    repositioning a directional antenna of the device based on the location of the portable device and transmitting an identified amount of power over a wireless signal to the portable device;
    detecting an object obstructing the wireless signal and determining whether to reposition the directional antenna based on the detected object;
    responsive to determining to reposition the directional antenna, repositioning the directional antenna to transmit the wireless signal around the detected object; and
    responsive to determining to not reposition the directional antenna, transmitting the wireless signal through the detected object.

2. The method for transmitting power to a portable device of claim 1 further comprising emitting polarized waves with the sensor to detect the location of the portable device.

3. The method for transmitting power to a portable device of claim 2 further comprising utilizing a time of flight of the polarized waves to detect the location of the portable device.

4. The method for transmitting power to a portable device of claim 1 wherein identifying an amount of power to transmit to the portable device includes receiving a power requirement from the portable device.

5. The method for transmitting power to a portable device of claim 1 wherein identifying an amount of power to transmit to the portable device includes identifying at least one of a make, a model, or a manufacturer of the portable device.

6. The method for transmitting power to a portable device of claim 1 further comprising identifying a frequency to utilize if transmitting the wireless signal with the identified amount of power from the device to the portable device.

7. The method for transmitting power to a portable device of claim 6 wherein the directional antenna is repositioned based on the frequency.

8. The method for transmitting power to a portable device of claim 6 wherein the directional antenna is dynamically tuned based on the frequency.

9. The method for transmitting power to a portable device of claim 6 further comprising determining whether the frequency is already being utilized by at least one of the device, the portable device, or another device and selecting a second frequency to utilize if the frequency is already being utilized and repositioning the directional antenna based on the second frequency.

10. A device comprising:
a sensor configured to detect a location of a portable device within proximity of the device, wherein the location comprises a direction and a distance of the portable device relative to the device;
a power source configured to supply power to the portable device;
a directional antenna configured to wirelessly transmit the power from the power source to the portable device; and
a controller configured to:
identify an amount of power to transmit to the portable device,
reposition the directional antenna to transmit an identified amount of power over a wireless signal based on the location of the portable device,
detect an object obstructing the wireless signal and determine whether to reposition the directional antenna based on the detected object;
responsive to a determination to reposition the directional antenna, reposition the directional antenna to transmit the wireless signal around the detected object; and
responsive to a determination to not reposition the directional antenna, transmit the wireless signal through the detected object.

11. The device of claim 10 wherein the portable device includes an antenna coupled to a portable power source to receive the identified amount of power over the wireless signal.

12. The device of claim 10 wherein the sensor emits circularly polarized waves over an ultra wide band to detect the location of the portable device relative to the device.

13. The device of claim 10 further comprising a communication component to detect information of the portable device for the controller to use to identify the amount of power to transmit to the portable device.

14. The device of claim 13 wherein the portable device transmits at least one of a location or an orientation of the portable device to the communication component.

15. The device of claim 14 wherein the directional antenna is repositioned based on at least one of the location or the orientation of the portable device.

16. The device of claim 10 wherein the directional antenna transmits the wireless signal with the identified amount of power as a directional beam.

17. A non-transitory computer readable medium comprising instructions that when executed cause a controller to:
emit polarized waves with a sensor to detect a location of a portable device within proximity of a device, wherein the location comprises a direction and a distance of the portable device relative to the device;
detect information of the portable device to identify an amount of power to transmit to the portable device;
reposition a directional antenna of the device based on the location of the portable device and transmit an identified amount of power over a wireless signal to the portable device;
detect an object obstructing the wireless signal and determine whether to reposition the directional antenna based on the detected object;
responsive to a determination to reposition the directional antenna, reposition the directional antenna to transmit the wireless signal around the detected object; and
responsive to a determination to not reposition the directional antenna, transmit the wireless signal through the detected object.

18. The non-transitory computer readable medium comprising instructions of claim 17 further comprising instructions that when executed cause the controller to identify at least one of a power consumption rate of the portable device or a battery level of the portable device.

19. The non-transitory computer readable medium comprising instructions of claim 17 further comprising instructions that when executed cause the controller to authenticate the portable device with an identification of the portable device before the directional antenna transmits power to the portable device.

* * * * *